(12) United States Patent
Ryan

(10) Patent No.: US 9,550,602 B2
(45) Date of Patent: Jan. 24, 2017

(54) COLLAPSIBLE REUSABLE CARRYING CASES

(71) Applicant: Gregory Joseph Ryan, Amity Harbor, NY (US)

(72) Inventor: Gregory Joseph Ryan, Amity Harbor, NY (US)

(73) Assignee: ALLPILLARS, INC., Amity Harbor, NY (US)

( * ) Notice: Subject to any disclaimer, the term of this patent is extended or adjusted under 35 U.S.C. 154(b) by 9 days.

(21) Appl. No.: 14/488,569

(22) Filed: Sep. 17, 2014

(65) Prior Publication Data

US 2015/0076143 A1    Mar. 19, 2015

Related U.S. Application Data

(60) Provisional application No. 61/871,306, filed on Sep. 18, 2013, provisional application No. 62/007,054, filed on Jun. 3, 2014.

(51) Int. Cl.
*B65D 6/16* (2006.01)
*B65D 1/46* (2006.01)
*B65D 1/22* (2006.01)

(52) U.S. Cl.
CPC ............... *B65D 1/46* (2013.01); *B65D 1/225* (2013.01); *B65D 2313/00* (2013.01); *Y02W 30/807* (2015.05)

(58) Field of Classification Search
USPC ....... 220/4.28, 6, 7, 666; 280/651, 648, 642, 280/30
See application file for complete search history.

(56) References Cited

U.S. PATENT DOCUMENTS

| | | | | |
|---|---|---|---|---|
| 3,360,180 A | * | 12/1967 | Venturi | B65D 1/225 220/6 |
| 3,410,441 A | * | 11/1968 | Rhyne | A47B 88/0014 220/4.28 |
| 3,557,855 A | | 1/1971 | Weingarten et al. | |
| 3,597,874 A | * | 8/1971 | Ogsbury | A63H 33/065 446/104 |
| 3,658,035 A | * | 4/1972 | Harris | A01K 63/003 119/269 |
| 3,955,245 A | * | 5/1976 | Ballin | A44B 18/0053 24/585.1 |

(Continued)

*Primary Examiner* — J. Gregory Pickett
*Assistant Examiner* — Gideon Weinerth
(74) *Attorney, Agent, or Firm* — Alfred M Walker; John F Vodopia

(57) ABSTRACT

Collapsible reusable carrying cases are provided in sizes varying from small food containers to large push cart bins on casters. The cases are assembled or disassembled from a joined flat space-saving configuration to a functioning case and vice-versa. All parts that make up a carrying case do not separate from the carrying case and no parts can be removed. The cases are formed from rigid plastic panels, and are assembled or disassembled without tools. The sides of the cases are erected progressively by hand by interlocking elements at the corners. The panels also disassemble progressively by being manually pulled apart. When folded into a flat storage or shipping configuration, the panels stay together, resisting unfolding by virtue of snaps which are either molded into the panels or bonded to them. The carrying cases are resistant to water, dirt, bacteria, molds, allergens, and inclement weather.

20 Claims, 15 Drawing Sheets

(56) References Cited

U.S. PATENT DOCUMENTS

| | | | |
|---|---|---|---|
| 4,230,227 A | 10/1980 | Kowall et al. | |
| 4,402,397 A * | 9/1983 | Spence | B65D 11/1873 |
| | | | 217/65 |
| 4,491,231 A | 1/1985 | Heggeland et al. | |
| 4,503,973 A | 3/1985 | Andersson | |
| 4,508,237 A | 4/1985 | Kreeger et al. | |
| 4,804,136 A | 2/1989 | Hall | |
| 4,820,383 A | 4/1989 | Shchamorov et al. | |
| 4,860,896 A * | 8/1989 | Snider | B65D 67/02 |
| | | | 206/427 |
| 4,901,911 A | 2/1990 | Drexhage | |
| 4,946,527 A * | 8/1990 | Battrell | A44B 18/008 |
| | | | 156/60 |
| 5,016,753 A | 5/1991 | Henderson | |
| 5,077,870 A * | 1/1992 | Melbye | A44B 18/0049 |
| | | | 24/452 |
| 5,195,644 A * | 3/1993 | Schmid | B65D 1/225 |
| | | | 220/6 |
| 5,212,853 A * | 5/1993 | Kaneko | A44B 18/0053 |
| | | | 24/306 |
| 5,295,632 A | 3/1994 | Zink | |
| 5,450,962 A | 9/1995 | Uitz | |
| 5,454,477 A | 10/1995 | Bornhorst et al. | |
| 5,586,372 A * | 12/1996 | Eguchi | A44B 18/0053 |
| | | | 24/306 |
| 5,632,392 A | 5/1997 | Oh | |
| 5,634,532 A | 6/1997 | Bucher | |
| 5,867,876 A * | 2/1999 | Petersen | A44B 18/0053 |
| | | | 24/442 |
| 5,913,474 A | 6/1999 | Chu | |
| 5,996,885 A | 12/1999 | Chu | |
| 6,073,943 A * | 6/2000 | Serrault | B65F 1/02 |
| | | | 280/30 |
| 6,155,444 A * | 12/2000 | Liu | B65D 1/225 |
| | | | 220/7 |
| 6,220,473 B1 * | 4/2001 | Lehman | B65D 81/3858 |
| | | | 150/901 |
| 6,230,915 B1 * | 5/2001 | Liu | B65D 9/12 |
| | | | 217/122 |
| 6,293,418 B1 | 9/2001 | Ogden et al. | |
| 6,427,907 B1 | 8/2002 | Espinoza | |
| 6,460,724 B1 | 10/2002 | Bradford | |
| 6,474,541 B1 | 11/2002 | Chu | |
| 6,547,127 B2 | 4/2003 | Bradford | |
| 6,564,993 B1 | 5/2003 | Wassink | |
| 6,651,875 B2 | 11/2003 | Chu | |
| 6,688,516 B1 | 2/2004 | Ussen | |
| 6,824,042 B2 | 11/2004 | Chu | |
| 6,827,364 B1 * | 12/2004 | Martin | B62B 3/027 |
| | | | 280/641 |
| 6,948,616 B2 | 9/2005 | Gillani | |
| 7,048,135 B2 | 5/2006 | Smyers et al. | |
| 7,909,190 B2 * | 3/2011 | Schafer | B65D 25/005 |
| | | | 220/558 |
| 8,087,527 B2 * | 1/2012 | Johnson | B65D 21/0204 |
| | | | 206/504 |
| 8,261,923 B2 | 9/2012 | Blanchard | |
| 2003/0038457 A1 * | 2/2003 | Eskridge | B62B 1/12 |
| | | | 280/648 |
| 2006/0169690 A1 * | 8/2006 | Rothschild | A45C 7/0036 |
| | | | 220/7 |
| 2008/0190923 A1 | 8/2008 | Rovira Fontinals et al. | |
| 2012/0091133 A1 | 4/2012 | Escarpa Gil | |
| 2015/0076799 A1 * | 3/2015 | Ryan | B62B 3/02 |
| | | | 280/651 |

* cited by examiner

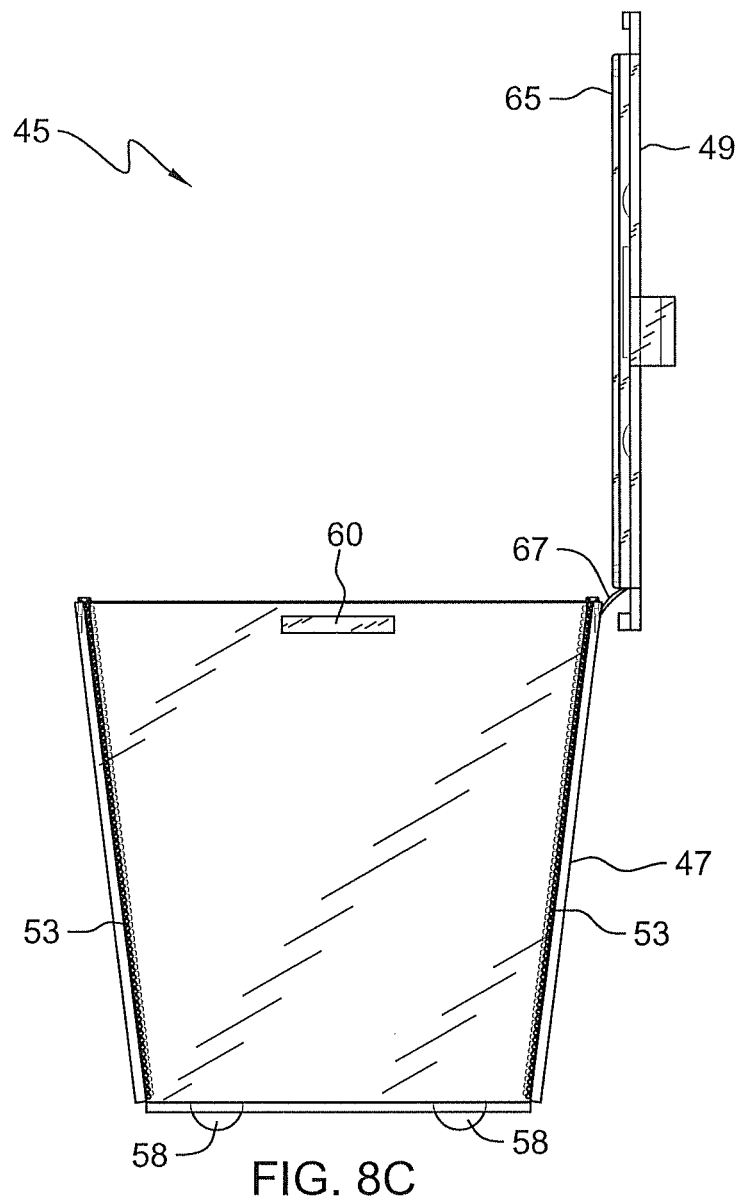

COLLAPSIBLE REUSABLE CARRYING CASES

RELATED APPLICATIONS

This application claims benefit and priority of provisional application Ser. No. 61/871,306 filed Sep. 18, 2013 and provisional application Ser. No. 62/007,054 filed Jun. 3, 2014, under 35 U.S.C. §119(e), which applications are incorporated by reference herein.

FIELD OF THE INVENTION

The present invention relates to collapsible, foldable and/or reusable carrying cases.

BACKGROUND OF THE INVENTION

The prior art reveals many patents describing collapsible, foldable, and/or reusable containers or carrying cases.

U.S. Pat. Nos. 6,293,418, 4,491,231, 4,820,383, 5,450,962, 8,261,923, 7,048,135, and US Patent Application Publication number 2012/0091133, show molded plastic containers or boxes that are assembled or disassembled with the use of a variety of latches and hinges.

U.S. Pat. No. 5,016,753 shows a variable height telescoping packaging system. US Patent Application Publication number 2008/0190923 reads to a foldable container with a rigid base which may include wheels. U.S. Pat. No. 4,503,973 shows a corrugated cardboard box with a rigid base incorporating reinforcing plates with wheels or casters.

U.S. Pat. Nos. 4,804,136, 4,901,911, 5,295,632, 5,913,474, 5,996,885, 6,427,907, 6,460,724, 6,474,541, 6,547,127, 6,564,993, 6,651,875, 6,688,516, and 6,824,042 generally incorporate foldable sections of corrugated cardboard or similar plastic panels with plastic or metal molded reinforcing elements.

OBJECTS OF THE INVENTION

However, the above noted prior art does not reveal collapsible reusable carrying cases of a wide variety of sizes, that can be constructed of molded plastic panels, with integral fittings or of corrugated plastic panels, with attached molded fittings that assemble by progressively engaging the side edges and fold on living hinges integral with the flat sections.

It is therefore an object of the present invention to provide a collapsible, foldable, and/or reusable container/carrying case including:

a substantially rectangular bottom panel;

a pair of upwardly extending end panels connected to the bottom panel at fold lines;

a pair of upwardly extending side panels connected to the bottom panel at fold lines;

a cover panel joined to a top edge of one of these side or end panels at a fold line;

the bottom panel, end panels and side panels forming a top opening, and the cover panel swiveling between a position closing the top opening and a position exposing the top opening;

wherein these side and end panels have releasable closure attachments where side edges of the side and end panels meet forming the collapsible carrying case; and whereby the panels open up to form a flat, interconnected assembly for storage and shipping.

It is yet another object of the present invention to provide a method of forming and using a reusable and stackable carrying case including the steps of:

forming the carrying case from a substantially rectangular bottom panel, a pair of upwardly extending end panels connected to the bottom panel at fold lines, a pair of upwardly extending side panels connected to the bottom panel at fold lines, and a cover panel joined to a top edge of one of the side or end panels at a fold line;

folding the end panels and side panels upwardly forming a top opening;

swiveling the cover panel between a position closing the top opening and a position exposing the top opening;

using releasable closure attachments along side edges of adjoining side and end panels for securing corners of the carrying case;

using the carrying case to store or ship contents therein; and after emptying the carrying case, opening the panels open up to form a flat, interconnected assembly for storage and shipping.

Other objects will become apparent from the following description of the present invention.

SUMMARY OF THE INVENTION

The present invention includes several common features used to create collapsible reusable carrying cases in sizes varying from small food containers to large push cart bins on casters. If one is introduced to any one of the sizes of containers or cases of this invention, it would be intuitive to assemble or disassemble any case of another size in the same general fashion, going from a joined flat space-saving configuration to a functioning case and vice-versa.

Although several different embodiments are included in this invention, all of the collapsible reusable carrying cases share these common attributes. All parts that make up a carrying case do not separate from the carrying case. No parts can be removed. Rigid plastic panels are used for constructing the cases; these may vary from synthetic materials, such as polyvinyl chloride to polypropylene or other such thermoplastic resins. No tools are required for assembly or disassembly. The sides of the cases are erected progressively by hand by interlocking elements at the corners. The panels also disassemble progressively by manually pulling apart. When folded into a flat storage or shipping configuration, the panels stay together, resisting unfolding by virtue of snaps which are either molded into the panels or bonded to them. Because of the carrying case material and the way it is constructed, it is resistant to water, dirt, bacteria, molds, allergens, and inclement weather. This extends the life of the product and insures that it can be reused over and over again for a number of years.

The carrying cases of this invention offer low first cost relative to their durability as compared with other alternatives. For example, cardboard cartons may be less expensive but their durability is lacking, while plastic cases as in the prior art often require heavy panels and metal hinges and latches. For businesses that use multiple carrying cases to ship their products, these carrying cases can be labeled with a specific digital bar code to identify the owner. Depending on the size, the customer can mail the carrying case back to the company (perhaps free of charge) after the customer takes his product out of the carrying case. He or she would then be credited for sending it back. Alternatively, he or she can take the empty case back to the store of purchase and get a refund of their deposit. Because these cases do not need to be recycled (like cardboard boxes), they are a Green Friendly Product. After a case of this invention has deteriorated from normal wear and tear after many use cycles, it can be sent back to the manufacturer and refurbished by spraying a coat of the material from which it was made. Plastic or fabric tape can be used to reinforce or rejuvenate fold lines. This process rejuvenates the case to its original serviceable form adding years of service life.

Depending on size, the method of choice to construct these cases is of molded panels with integral fittings or of corrugated plastic panels (such as polypropylene) with features such as edge fittings bonded to the panels. Folding of molded panels is achieved by incorporating living hinges in the mold at the fold lines. Corrugated polypropylene can be folded using methods long used for cardboard boxes, namely creating fold lines by pressing a tool edge in the desired location; the corrugations are crushed forming a fold line if the line is orthogonal to the corrugations while one or two corrugations are flattened if the line is along the direction of the corrugations.

The edges of these cases are assembled progressively from base to top edge by engaging nibs which protrude at right angles to each panel on the inside at each corner. The engagement is reminiscent of the co-planar engagement elements of an ordinary zipper; however, these nibs engage at right angles (orthogonal to each other); they are of a different shape and resilient material, and the engagement is manually accomplished without the use of a metal guide. The corners are separated to collapse the container by just pulling apart a corner progressively from top edge to bottom by hand. For all except the smallest containers, an inverted U-shaped captive metal locking pin is used to lock the side panels at the top edges at each corner; these are simply engaged or disengaged by the "lift and rotate method" to resist pulling apart. If deemed necessary by application, further side panel reinforcement is achieved by incorporating a stiff rod (such as a ⅛" diameter steel rod) at each top edge to strengthen the side panels. Multiple carry cases can be stacked on top of one another when assembled and in use. Collapsed carry cases with panels snapped together can be stacked horizontally or stored vertically. Carry cases can have rectangular side panels which result in straight vertical sides when assembled, or the side panels can be trapezoidal which results in inwardly sloped sides for more ease in filling or emptying cases with contents. The latter also nest compactly when empty.

The first embodiment is a tote box with hand-hold cutouts on two opposing sides. It is optionally fitted with an attached cover which is hinged (at a fold line) to the top edge of one of the sides. This embodiment can be made in a wide variety of sizes with or without hand holes and covers.

A second embodiment which is air and water tight is preferably made in small sizes (as for storage of food items) using molded transparent plastic panels. A resilient seal is bonded to one of each pairs of mating side edges adjacent to a row of engagement nibs. When assembled, the engaged nibs of the second side compress the resilient seal rendering the edge sealed. The nib profile is such that it biases the corner to pull the sides together when the nibs are engaged. The seal does not alter the method of assembly or disassembly. A cover is attached to one side at the top edge at a fold which acts as a hinge (as in the first embodiment). The cover has an inner linear seal along the three cover edges adjacent to the overhanging lip but a short distance away leaving a groove which engages and compresses the seal against the inner surface of the top edges of the three sides thereby sealing the cover to the sides when pressed down. In a further embodiment, there is no fold-hinged top. Instead, a molded top cover of more resilient plastic with a continuous integral seal on all four edges is used; this could be made of a variety of thermoplastic elastomers or even silicone. This cover is sized such that the seal engages the top edges of all four sides; the seal is effected by pressing down whereby both the inner and outer container side surfaces are captured in the groove of the integral seal. Since this molded cover is separate, it is attached to the back side of the container loosely at the top edge by a strip of elastomeric tape so as not to interfere with the proper alignment and engagement or disengagement of the cover.

The next embodiment is a push/pull cart which can be of substantial dimensions (such as a tub 3' high, 3.5' long and 3' wide) with an integral bottom steel frame and four double casters for easier maneuverability. This push cart has a cover hinged at a fold line with four cut-outs to accommodate the casters of a cart stacked above (whether assembled or flattened). The cut-outs prevent the casters from causing a stack of push carts from sliding off one another. Using a particular sequence of folding and snapping the panels together when collapsing a tub, the push cart is transformed into a compact flat shape attached to the bottom frame. In yet another embodiment, the push cart is fitted with a fail-safe central-locking brake system. The brake is engaged by a foot pedal which is pushed down into a latched position providing both auditory (a click) and tactile (through the foot) feedback of having achieved the locked state. The brake is disengaged by a brake release pedal which unlatches the brake pedal whereby it rises. The brake pedal engages four separate brake elements on all four double casters which keeps each caster from rotating or swiveling.

BRIEF DESCRIPTION OF THE DRAWINGS

The present invention can best be understood in connection with the accompanying drawings. It is noted that the invention is not limited to the precise embodiments shown in drawings, in which:

FIGS. 8A, 8B, and 8C show three views of a transparent air and water-tight food container built according to this invention; 8A is a perspective view with the lid closed, 8B is a perspective view with the lid open showing the four-sided gasket, and 8C is a side elevation showing the elastomeric cover hinge.

FIGS. 12A-12D illustrate the four steps required to fold the push-pull cart to a compact configuration shown in FIG. 12E.

FIG. 13A shows the metal subframe with braking components attached. FIG. 13B is a side detail of the brake pedal subassembly. FIG. 13C is a side view of a ring brake element, while FIG. 13D is a top view.

DETAILED DESCRIPTION OF THE DRAWINGS

Figure 1:
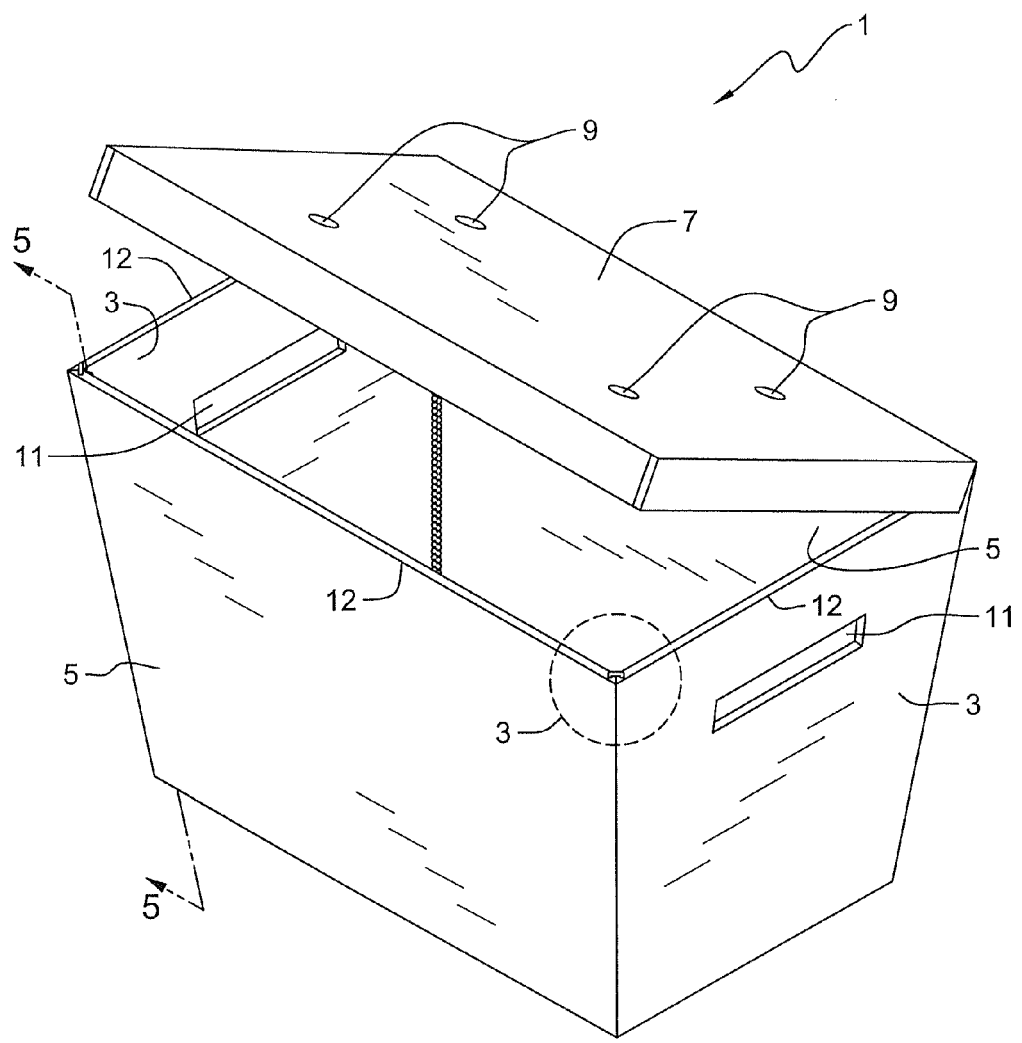
FIG. 1 is a perspective view of an assembled collapsible tote box constructed in the manner of this invention.

FIG. 1 shows a collapsible tote box 1 with cover 7 and hand holes 11 in opposite end panels 3. A bottom 17 (shown in FIG. 2) and two side panels 5 complete the carrying case in the form of this tote box 1. Optional reinforcement rods can be attached (or molded over) at top edges 12. Indentations 9 on the top of cover 7 are in registration with molded feet on the bottom (not shown) to permit stacking of assembled tote boxes 1 while resisting sliding sideways.

Figure 2:
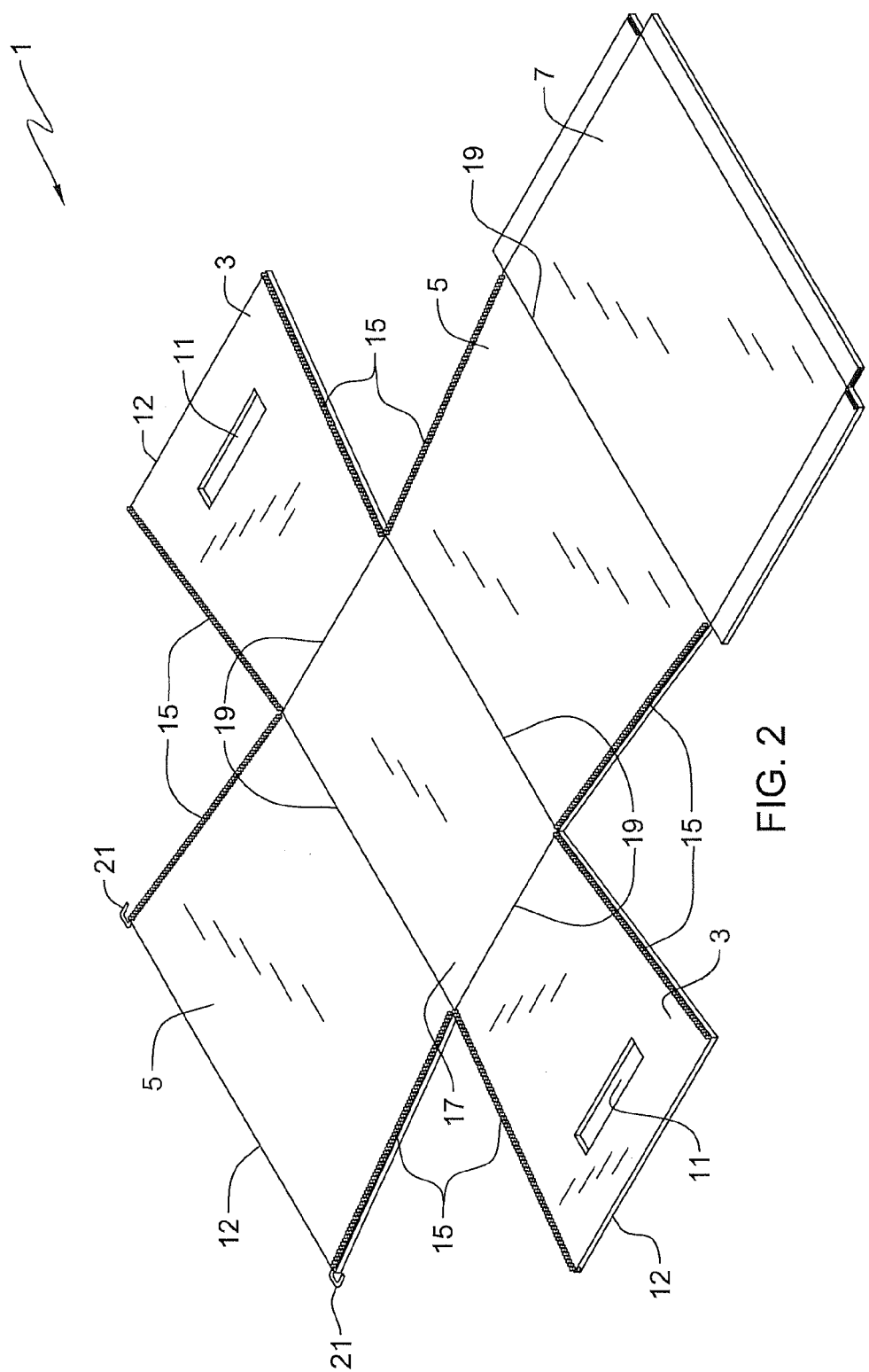
FIG. 2 is a perspective view of the tote box of FIG. 1 with all panels flattened to a collapsed configuration.

FIG. 2 shows a collapsed view of tote box 1 showing the location of rows of assembly nibs 15 at adjacent panels. Lines 19 denote fold lines which may be living hinges if box 1 is molded or actual folds if corrugated plastic panels are used.

Figure 3:
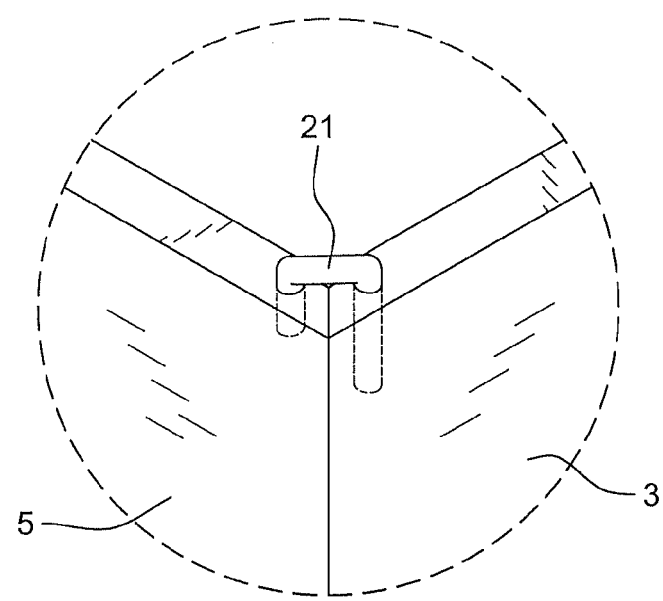
FIG. 3 is a close-up perspective detail of a corner reinforcing (inverted U) locking pin with one captive leg which keeps it attached to the collapsible container.

FIG. 3 shows a captive inverted U-pin 21 used to reinforce the corner at the top. The longer leg is captive (not detachable) but permits lifting of pin out of contact with adjacent panels 3 and 5, and also permits rotation for disassembly and assembly.

Figure 4:
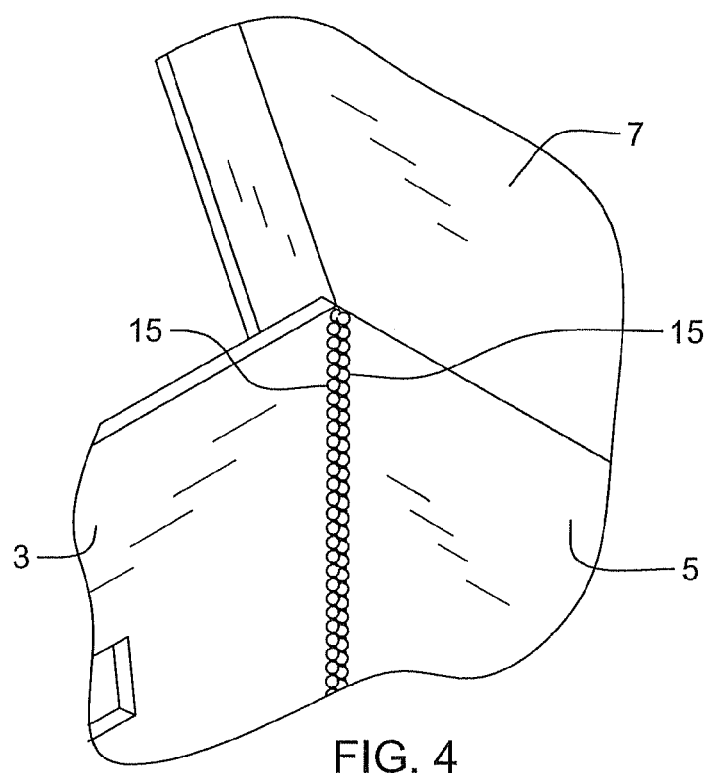
FIG. 4 is a close-up perspective detail of an inside corner of the tote box of FIG. 1 showing the engagement of a line of nibs protruding at right angles from the surfaces of adjacent sides.

FIG. 4 is a detail showing the engagement of the rows of nibs 15 attached to adjacent panels; these are used to progressively assemble and disassemble tote box 1.

Figure 5:
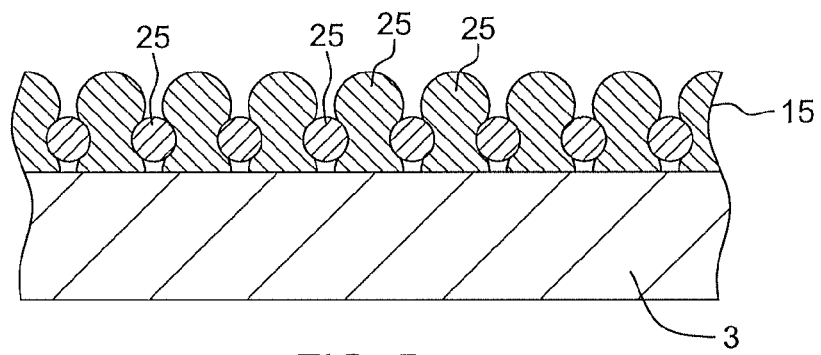
FIG. 5 is an enlarged side crossectional view of an edge joint showing the fit of nibs of FIG. 4 with their profile clearly outlined.

FIG. 5 shows a crossection detail of the two rows 15 of adjacent orthogonal nibs 25 as engaged. The profile of each nib 25 is shown with dome section at distal end, smaller neck, and wider base attached to box panel 3. These nibs 25, in most cases, would be molded separately in strips 15 which are then attached along the edges of the box. This permits them to be molded of a flexible material, such as a thermoplastic elastomer (TPE) or silicone which is more flexible than the material of the tote box, a more rigid resin such as polypropylene, polycarbonate, PVC, etc. It is noted that the engagement at the neck of each nib 25 causes the nibs to actually pull the panels together at the corners.

Figure 6:
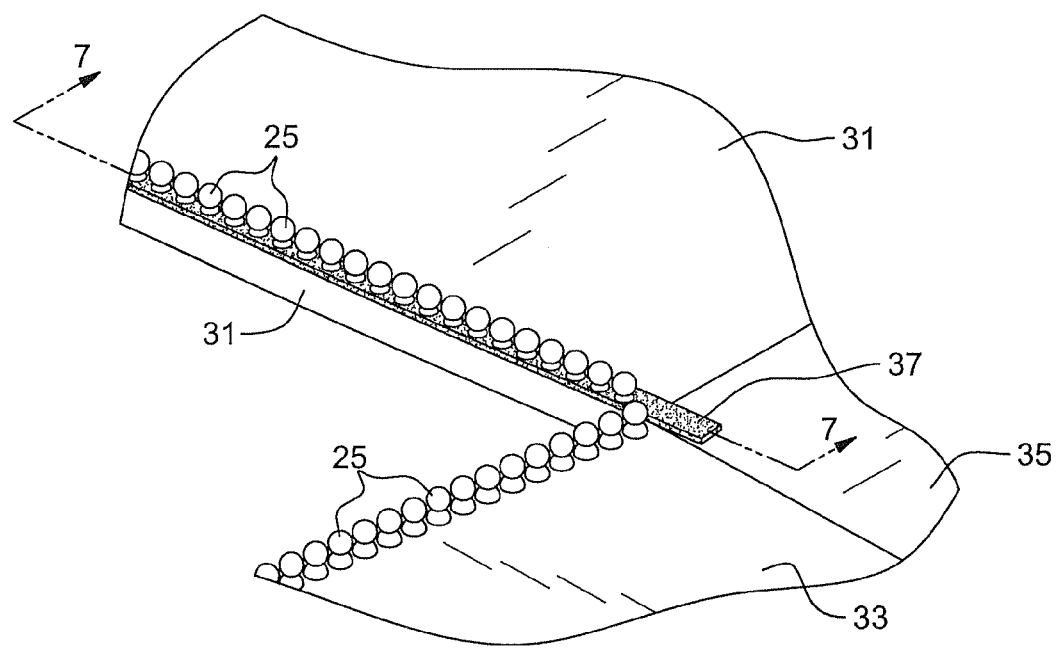
FIG. 6 is a perspective detail of adjacent edges of sides of a carrying case when in a flat collapsed configuration showing the addition of a linear seal to seal the corner when assembled.
Figure 7:
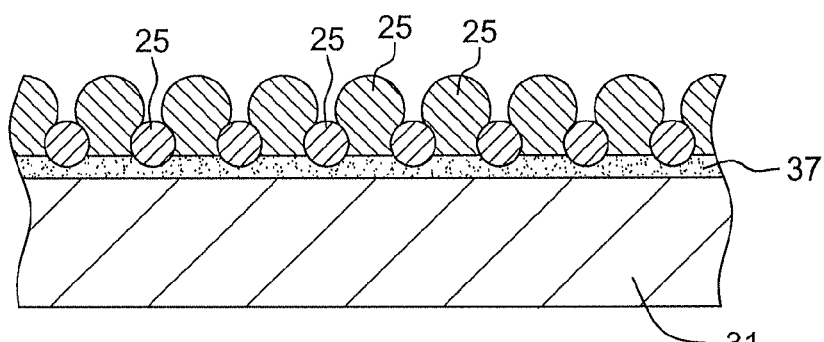
FIG. 7 is an enlarged side crossectional detail (as in FIG. 5) with the addition of the linear seal of FIG. 6 showing the seal sealing the crossed engaged rows of nibs.

In an alternate embodiment of FIGS. 6 and 7, the carrying cases are required to be air and water-tight. The linear seal or gasket 37 shown added around the base of a line of nibs 25 of one of a pair of adjacent nib lines in FIG. 6 before assembly will seal that edge after assembly of sides 31 and 33 as they are progressively interlocked from bottom panel 35. FIG. 7 is a crossectional view showing crossed engaged nibs 25 deforming linear seal 37 locally to effect the seal.

Figure 8A:
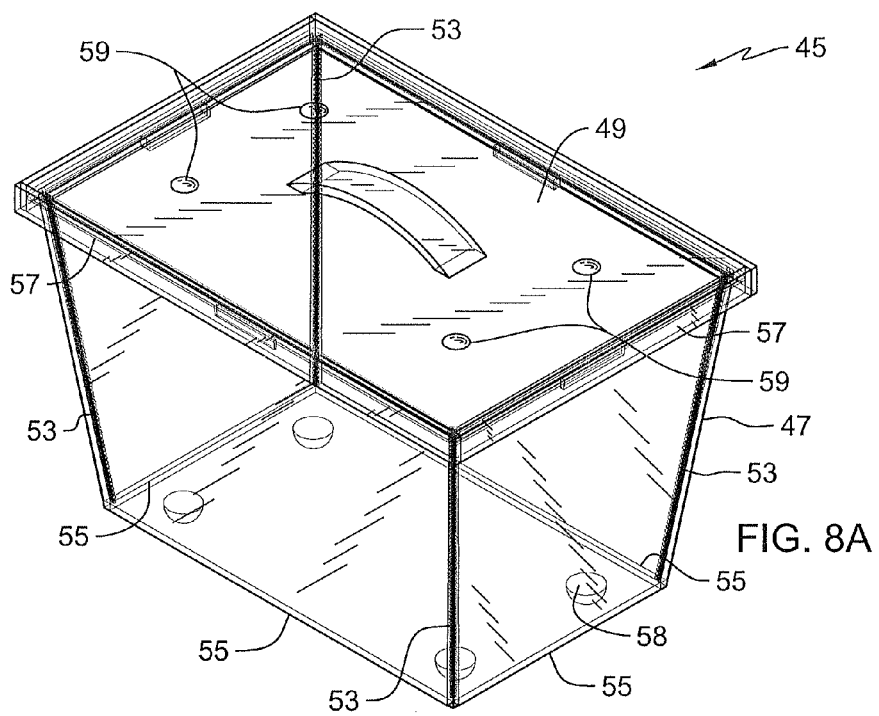
Figure 8B:
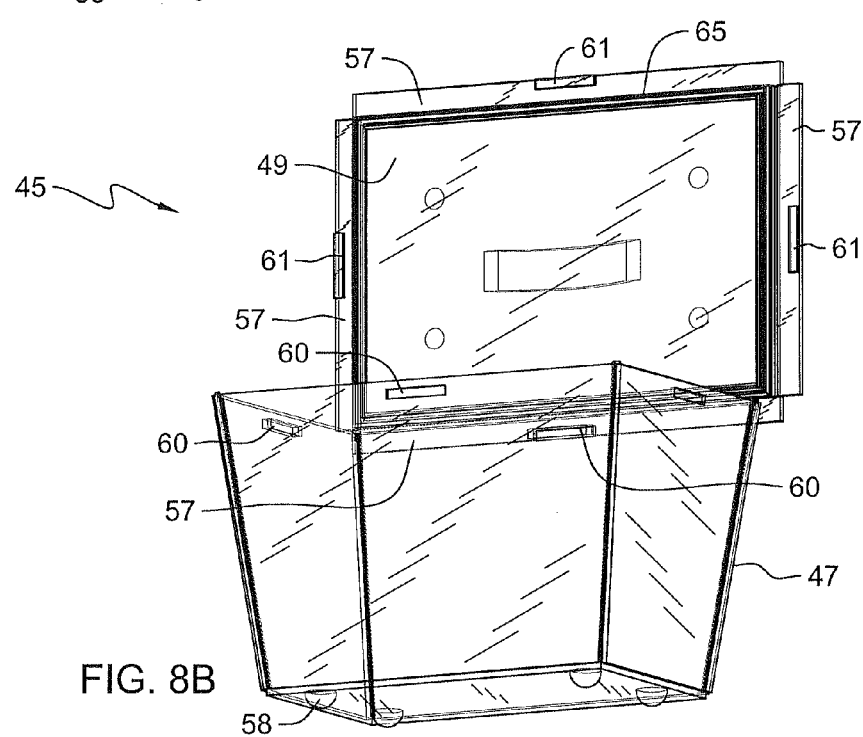

A small collapsible water tight food container 45 is shown in FIGS. 8A-8C. It is made of transparent panels with a transparent cover 49 both for aesthetics as well as utility to be able to view and identify the contents. To insure air and water-tightness, edges 53 are assembled from sealed nib lines as shows in FIGS. 6 and 7. Fold lines 55 are molded living hinges. Cover 49 is made of a transparent TPE or silicone with integrally molded gasket 65 along all four edges capturing and sealing the top edge of all four rigid side panels. For extra sealing insurance, extra sealing can be added inside cover 49 at the corners. Flaps 57 around all four edges of cover 49 have male protrusions 61 which fit into and lock within molded recesses 60 molded into the sides in registration. These locks keep cover 49, seal 65 and the top edges of container part 47 in intimate contact. Elastomeric hinge 67 (see FIG. 8C) attaches cover 49 to container 47 in such a manner so as not to interfere with the proper alignment, engagement or disengagement of cover 49 which must be pressed down vertically. Recesses 59 in cover 49 are in registration with molded feet 58 to prevent stacked containers 45 from sliding off each other.

Figure 9:
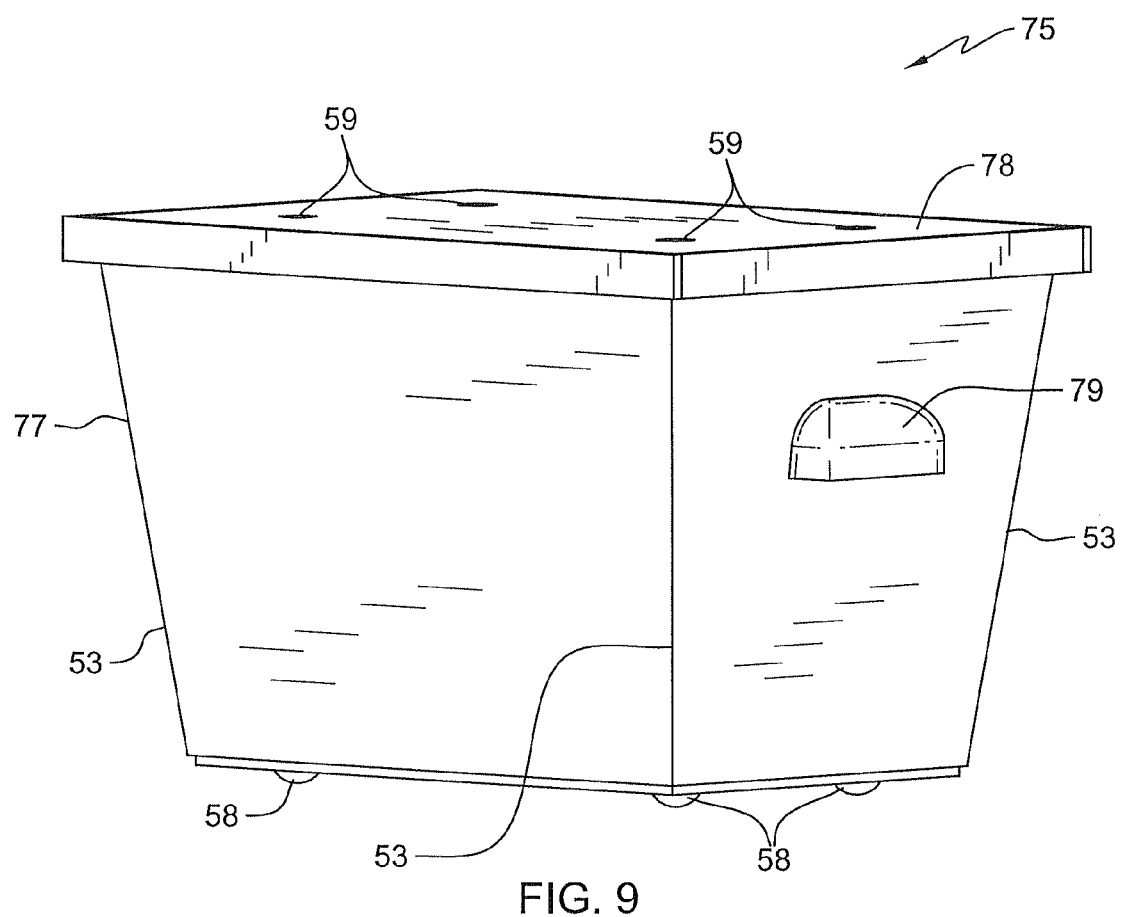
FIG. 9 is a perspective view of a collapsible produce carrying case of larger dimensions than that of FIG. 8 with external handles, but which shares the air and water-tight sealing of the smaller containers.

FIG. 9 shows a larger collapsible produce carrying case or tote 75 with external handles 79. The construction is similar to that of food container 45 also being air and water-tight although not necessarily transparent. Cover 78 may be molded with integral seal, or a rigid cover with attached resilient seal within may be used to seal with the top edges of container 77.

Figure 10:
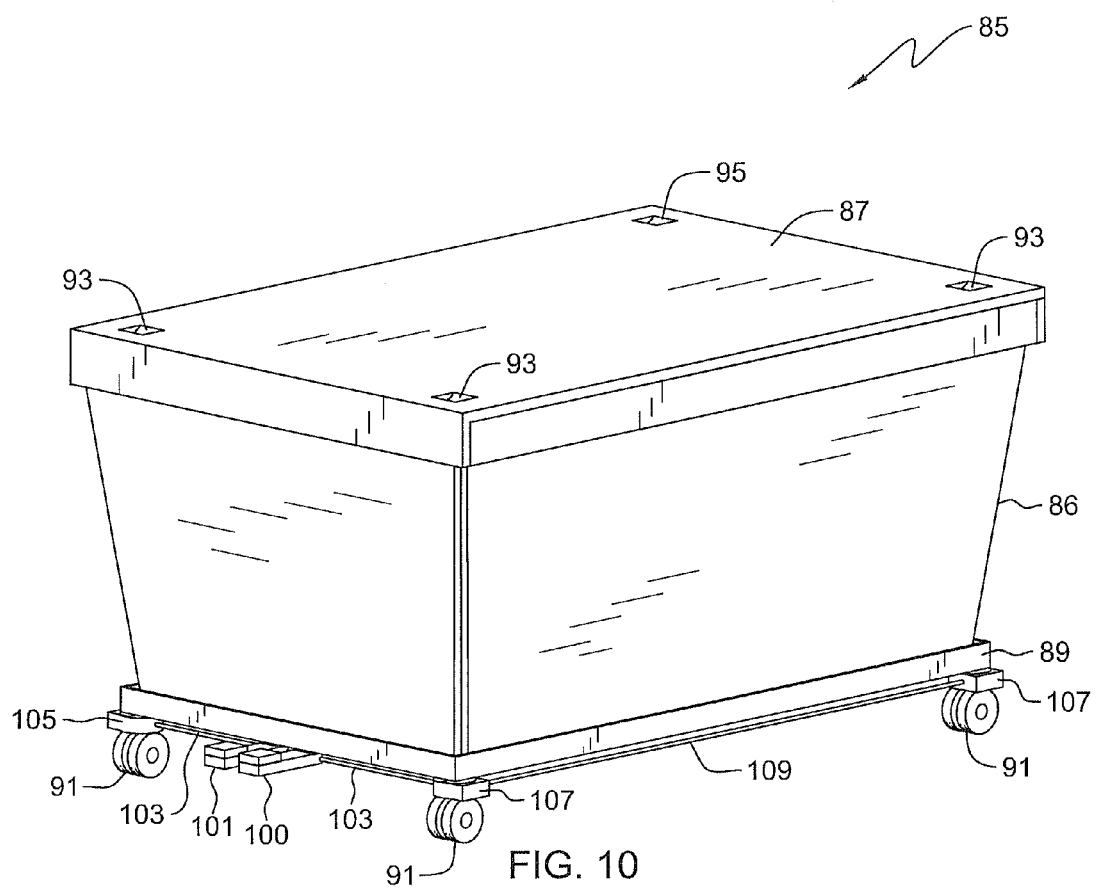
FIG. 10 is a perspective view of a push-pull cart attached to a bottom metal frame with casters; it is constructed with rows of nibs on the edges and folding sides so it can be collapsed and then folded compactly atop the metal frame. It is shown with the optional central braking system.
Figure 11:
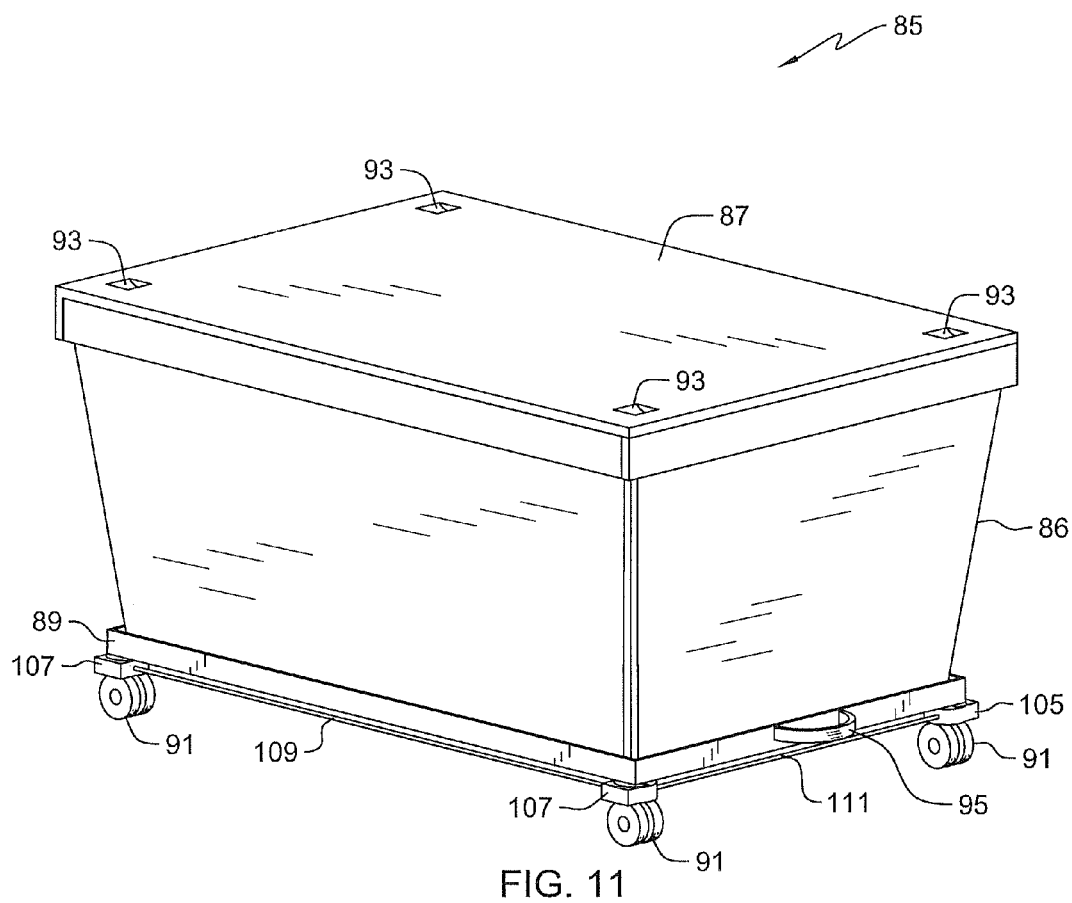
FIG. 11 is a perspective view of the push-pull cart of FIG. 10 showing the front end with tow loop.

FIG. 10 is a side and back view of the push-pull cart 85 of this invention. It is attached to a metal subframe 89 with four double casters 91 for ease in moving in any direction with minimal resistance. Elements of the optional central braking system are shown and will be described later in more detail in FIGS. 13A-13D. Container section 86 is assembled as described in previous embodiments using strips of engagement nibs at all four upright edges. The bottom is attached to the metal frame in a permanent fashion. Cover 87, which is hinged at a fold line to the back side, has four recesses 93 on the top to accept four double casters 91 of a push-pull cart which may be stacked atop in either the assembled or folded down configuration to prevent sliding off. FIG. 11 shows the front of cart 85 revealing tow loop 95.

Figure 12A:
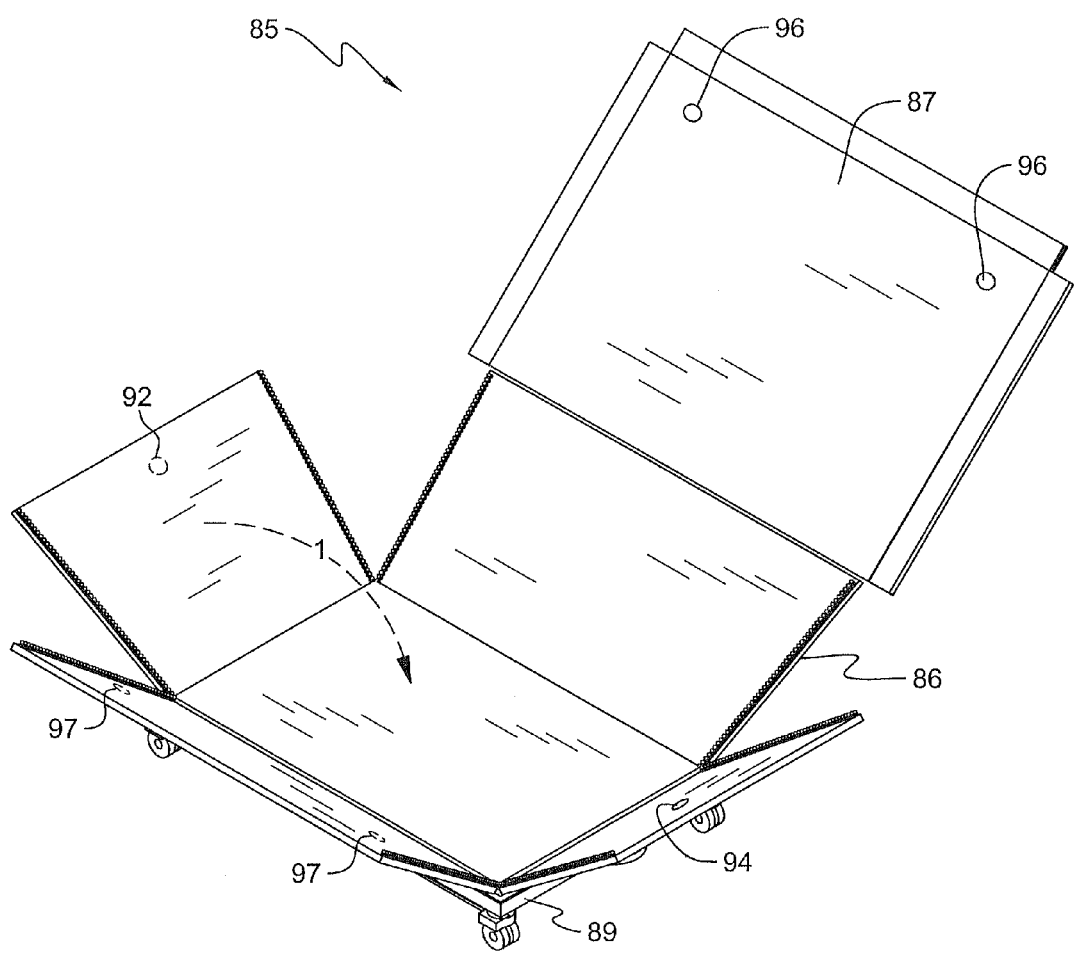
FIGS. 12A-12E show the steps involved in collapsing and then folding the push-pull cart of FIG. 10.
Figure 12B:
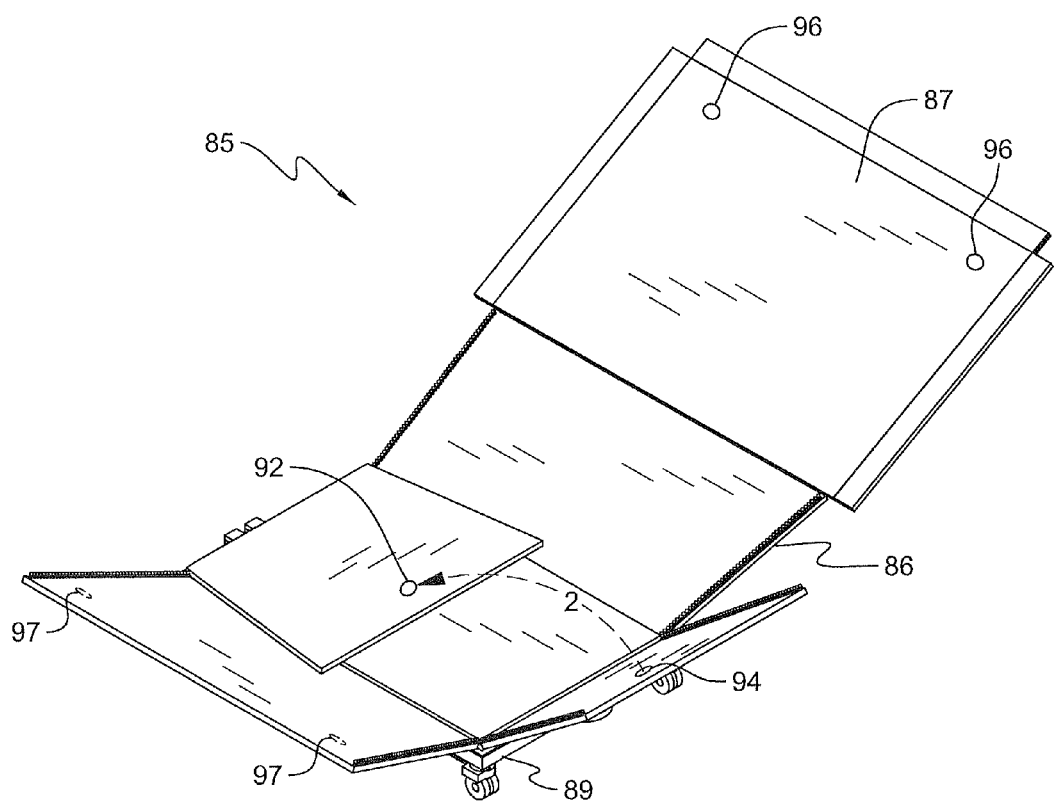
Figure 12C:
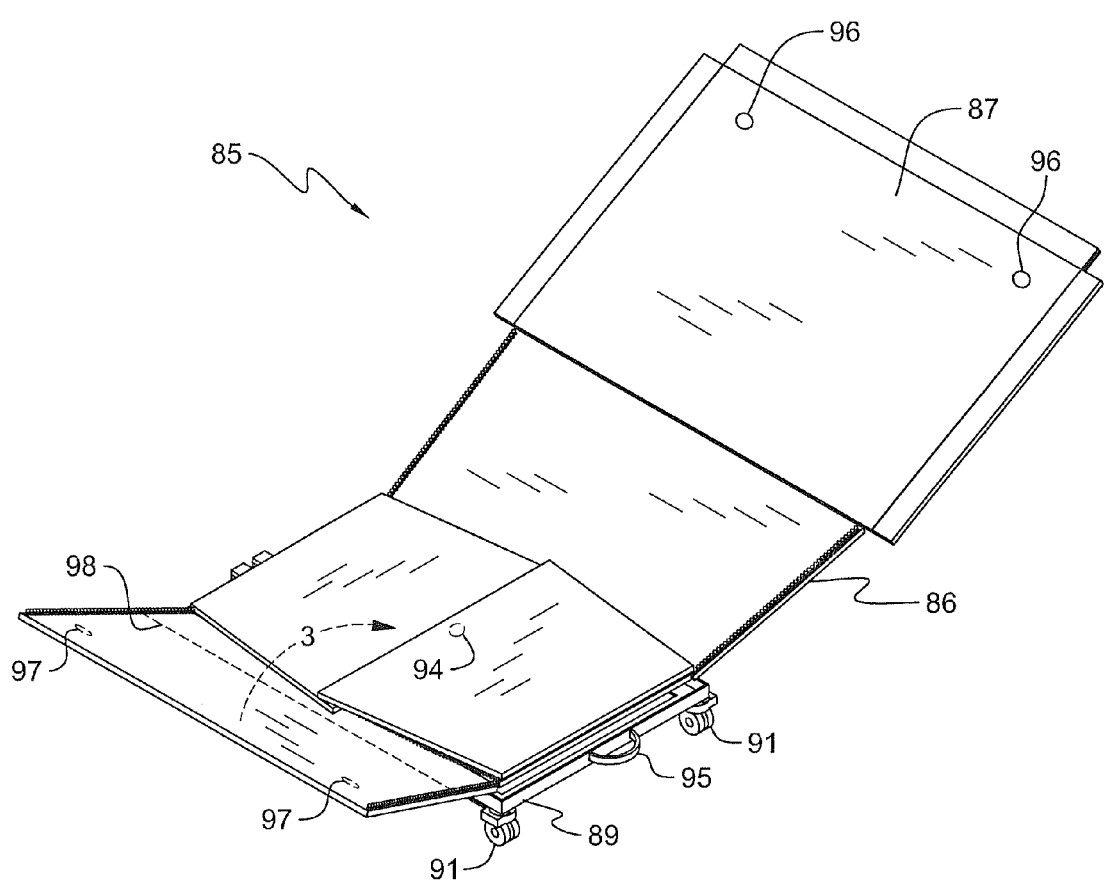
Figure 12D:
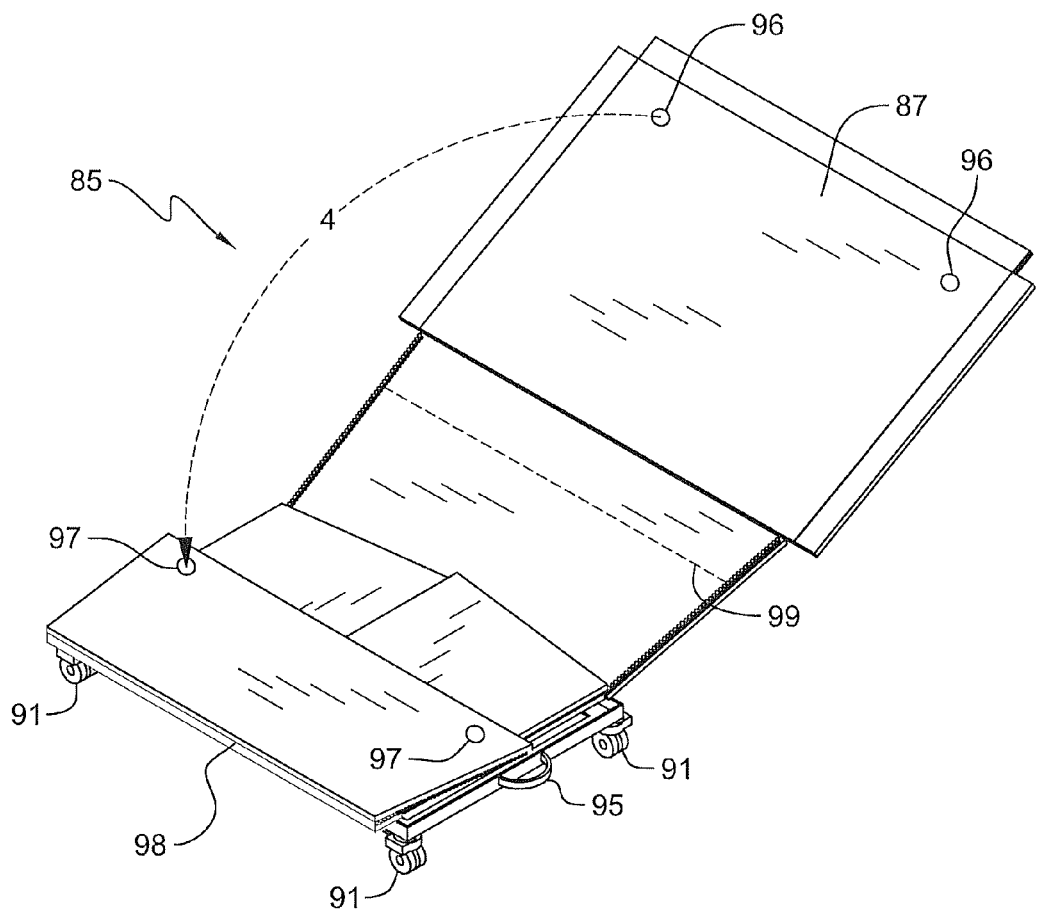
Figure 12E:
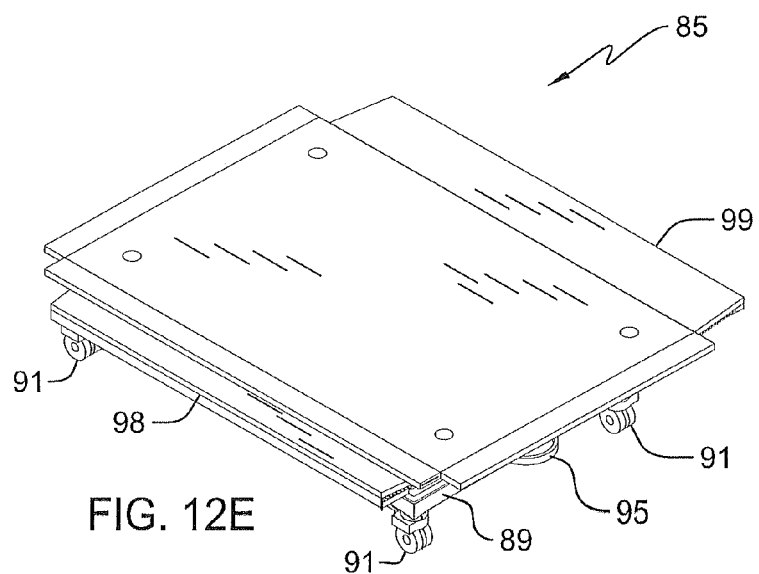

Push-pull cart 85 has side panels which cannot be folded backwards at the bottom hinge lines because of attached metal bottom frame 89. A four step folding procedure of the collapsed cart is shown in FIGS. 12A-12D. In step 1 of FIG. 12A one sees one end being folded inward toward the bottom which will place outside surface snap 92 facing up. Also shown are mating snap 94 on the opposite end panel, and snaps 96 on the inside surface of cover 87 and mating snaps 97 on the outside of the opposite side panel. In step 2 of FIG. 12B the other end panel is folded inward and snapped into 92 via inside snap 94. In FIG. 12C a fold line 98, only used in the collapsed configuration, is revealed. In step 3 side panel is folded inward at 98 placing outside snaps 97 face up. In FIG. 12D fold line 99 is revealed on the opposite side; it is only used in the collapsed configuration. In step 4 cover 87 with a portion of the attached side are folded inward at line 99 wherein inside snaps 96 are mated with snaps 97 thereby completing the fold sequence resulting in the compact snapped together configuration shown in FIG. 12E.

Item numbers 100 and above are reserved for optional brake subsystem components. Some of these may be seen on FIGS. 10 and 11. Although many variations are possible, FIGS. 13A-13D show (in schematic fashion) one workable implementation. The braking system is engaged on all four double casters simultaneously (components will also work on single casters) by pressing down on a brake pedal until it is latched in the down position. This engagement prevents casters from rotating or swiveling regardless of the direction they were pointing at the time. The brake is simultaneously released from all four double casters by pressing the release pedal which releases the brake pedal latch permitting the return spring to lift up the brake pedal. The action is fail-safe in that a defective pedal return spring or gear or rod will not release the brake action once it is latched; this will prevent the push-pull cart from careening down a slope.

Figure 13A:
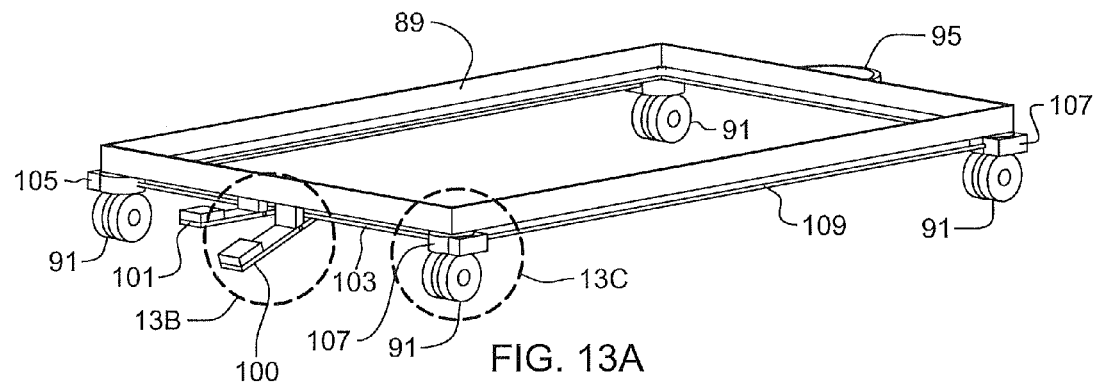
FIGS. 13A-13D pertain to the optional central braking system.
Figure 13B:
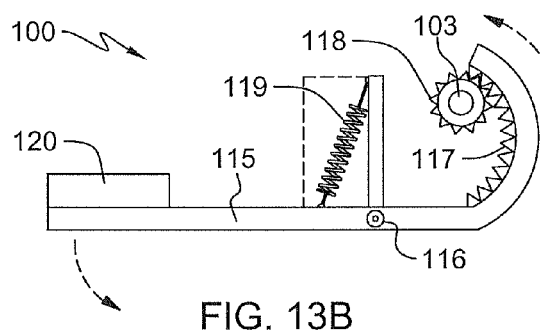
Figure 13C:
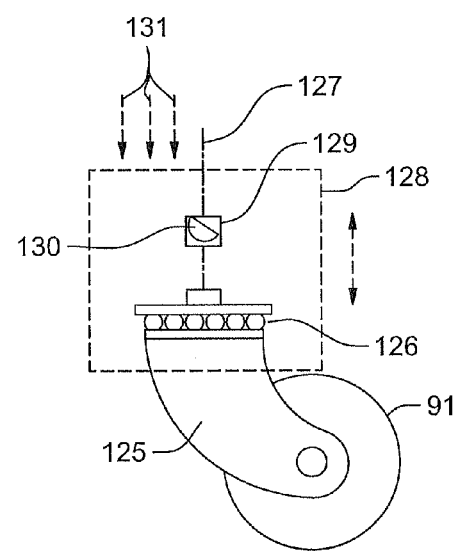
Figure 13D:
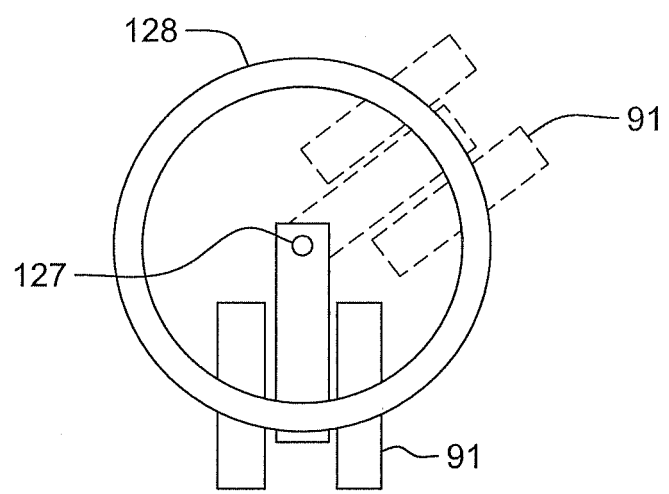

FIG. 13A shows bottom metal frame 89 detached from container section 86 for clarity. Brake pedal 100 and release pedal 101 are shown at the rear of cart 85; brake rod 103 goes from housing 107 to housing 105 through the brake pedal assembly gear 118 (shown in FIG. 13B). Housings 105 (also shown in FIGS. 10 and 11) contains a ring brake element as depicted in FIGS. 13C and 13D. Housings 107 as also shown on FIGS. 10 and 11 include ring brake elements as in 105, but they also have a pair of meshed bevel gears (preferably molded plastic) to extend the action of brake rod 103 synchronously to extension rod 109 and onward to front brake rod 111 (shown at the front in FIG. 11). FIG. 13B illustrates the side view of brake pedal assembly 100. Rigid chassis 115 is pivoted at 116 and pulled up to the "brake not applied" position by robust extension spring 119. The front of chassis 115 is configured as a sector of internal gear 117 which is meshed with pinion gear 118 which turns brake rod 103. Rubber pad 120 is at the distal end. Gear 118 is sized to turn 180 degrees over the excursion of brake pedal 100 over its rotation from up position to bottom latched position (latch not shown). In this manner, the rotary motion of brake rod 103 which operates on the two rear double casters is conveyed along the side via extension rod 109 through meshed bevel gears (not shown) in rear housing 107 and then onward through brake rod 111 at the front through front meshed bevel gears in 107 to operate the front two double caster ring brakes.

The operation of the ring brake elements 128 above each double caster is illustrated in side view 13C and top view 13D. Caster 91 (depicted as a single caster for clarity) with arm 125 and swivel ball bearing 126 is shown under ring brake element 128 which is centered on swivel axis 127. The bottom edge of ring brake 128 may have a ring of high friction material. Ring brake element 128 is housed in a cylinder housing (not shown) to restrict its movement to the vertical direction. The end of the operating brake rod is machined into a semicircular cam 130 and penetrates the side of 128 inside a square hole. A compression spring (not shown) exerts downward force 131 atop ring brake 128 forcing it down in contact with the top of caster 91 unless cam 130 is turned with it's flat side downward within hole 129 which action lifts it out of contact releasing the braking force. "flat side down" position of all cams 130 coincide with the up (brake released) position of brake pedal 100. The top view of ring brake element 128 of FIG. 13D shows how it's being centered over the swivel axis 127 of dual caster 91 permits action regardless of caster swivel position. The redundancy of having 4 separate local braking springs atop the 4 ring brake elements is also a safety feature.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

I claim:

1. A collapsible, foldable, and/or reusable container/carrying case comprising:
   a substantially rectangular bottom panel;
   a pair of upwardly extending end panels connected to said bottom panel at fold lines;
   a pair of upwardly extending side panels connected to said bottom panel at fold lines;
   a cover panel joined to a top edge of one of said side or end panels at a fold line;
   said bottom panel, end panels and side panels forming a top opening, said cover panel swiveling between a position closing said top opening and a position exposing said top opening;
   said side and end panels having releasable closure attachments where side edges of said side and end panels meet forming said carrying case;
   said releasable closure attachments comprising single rows of upwardly extending, spaced nibs on adjacent edges of said side and end panels;
   each nib comprising a base attached to a panel, a distal dome section, and a neck joining said base and said dome section;
   said single rows of upwardly extending, spaced nibs on adjacent edges of said side and end panels extending continuously top to bottom or side to side along the respective adjacent edges of said side and end panels of said container/carrying case;
   said single rows of said nibs on adjacent edges of said side and end panels interlocking at right angles to each other when said adjacent edges of said side and end end panels are brought edge to edge, flush together, with no gaps therebetween, to form said carrying case; and
   whereby said panels open up to form a flat, interconnected assembly for storage and shipping.

2. The collapsible, foldable, and/or reusable container/carrying case of claim 1 in which all of said panels are constructed of rigid plastic material.

3. The collapsible, foldable, and/or reusable container/carrying case of claim 2 in which said panels are molded plastic panels.

4. The collapsible, foldable, and/or reusable container/carrying case of claim 2 in which said panels are corrugated plastic panels.

5. The collapsible, foldable, and/or reusable container/carrying case of claim 3 in which said spaced nibs are mounted on and integral with strips attached along said adjoined edges of said side and end panels.

6. The collapsible, foldable, and/or reusable container/carrying case of claim 3 in which said nibs are molded material more flexible than the plastic material forming said panels.

7. The collapsible, foldable, and/or reusable container/carrying case of claim 6 having a gasket around a base line along each strip of said nibs for making said carrying case air and water-tight when fully deployed.

8. The collapsible, foldable, and/or reusable container/carrying case of claim 7 in which said fold lines are living hinges.

9. The collapsible, foldable, and/or reusable container/carrying case of claim 8 in which said cover panel has an integrally molded gasket along all four sides thereof.

10. The collapsible, foldable, and/or reusable container/carrying case of claim 9 in which said cover panel has downwardly extending flaps along outer edges thereof with male protrusions fitted into and lock with molded recesses molded into said side and end panels for extra sealing of said cover panel when closing said top opening.

11. The collapsible, foldable, and/or reusable container/carrying case of claim 9 in which at least one of said panels is transparent for viewing and identifying contents of said carrying case.

12. The collapsible, foldable, and/or reusable container/carrying case of claim 2 in which upper corners of a side or end panel opposite the fold line connected to said cover each have a captive inverted U-pin for reinforcing corners of said case, said U-pin having a pair of legs, a shorter leg and a longer leg so that when said pin is raised the shorter leg comes out of contact with one of said reinforcing corners allowing said U-pin to be rotated for disassembly and assembly, said longer leg remaining captive.

13. The collapsible, foldable, and/or reusable container/carrying case as in claim 2 wherein said molded flat plastic panels are made of a thermoplastic resin material selected from the group consisting of polyvinyl chloride, polycarbonate and polypropylene or combinations thereof.

14. The collapsible, foldable, and/or reusable container/carrying case as in claim 1 wherein respective sides of said collapsible, foldable, and/or reusable container/carrying case are erected progressively by hand by interlocking said closure attachments at the corners, and disassembled progressively by manually being pulled.

15. The collapsible, foldable, and/or reusable container/carrying case of claim 4 wherein said corrugated plastic panels are made of corrugated plastic and are foldable along fold lines by pressing a tool edge in the desired location; said corrugations being crushed forming a fold line if said fold line is orthogonal to the corrugations, further wherein respective edges of said molded flat plastic panels are assembled progressively from a respective base to a respective top edge by engaging said nibs which protrude at right angles to each panel on an edge thereof, forming each respective fold line, said engagement of said nibs being engageable at orthogonal right angles.

16. The collapsible, foldable, and/or reusable container/carrying case as in claim 1 wherein said side panels are rectangular, forming upright vertical walls when assembled.

17. The collapsible, foldable, and/or reusable container/carrying case as in claim 1 wherein said side panels are trapezoidal, forming sloping walls when assembled.

18. The collapsible, foldable, and/or reusable container/carrying cases comprising:
a substantially rectangular bottom panel;
a pair of upwardly extending end panels connected to said bottom panel at fold lines;
a pair of upwardly extending side panels connected to said bottom panel at fold lines;
a cover panel joined to a top edge of one of said side or end panels at a fold line;
said bottom panel, end panels and side panels forming a top opening, said cover panel swiveling between a position closing said top opening and a position exposing said top opening;
said side and end panels having releasable closure attachments where side edges of said side and end panels meet forming said carrying case;
said releasable closure attachments comprising single rows of upwardly extending, spaced nibs on adjacent edges of said side and end panels;
each nib comprising a base attached to a panel, a distal dome section, and a neck joining said base and said dome section;
said single rows of upwardly extending, spaced nibs on adjacent edges of said side and end panels extending continuously top to bottom or side to side along the respective adjacent edges of said side and end panels of said container/carrying case;
said single rows of said nibs on adjacent edges of said side and end panels interlocking at right angles to each other when said adjacent edges of said side and end end panels are brought edge to edge, flush together, with no gaps therebetween, to form said carrying case; and
whereby said panels open up to form a flat, interconnected assembly for storage and shipping;
in which upper corners of a side or end panel opposite the fold line connected to said cover each have a captive inverted U-pin for reinforcing corners of said case, said U-pin having a pair of legs, a shorter leg and a longer leg so that when said pin is raised the shorter leg comes out of contact with one of said reinforcing corners allowing said U-pin to be rotated for disassembly and assembly, said longer leg remaining captive; and,
wherein said container/carrying case further comprises a push cart with a wheeled frame supported by casters and a central-locking brake system engageable by a foot pedal which is pushed down into a latched position providing both auditory a tactile feedback of having achieved the locked state, said brake being disengaged by a brake release pedal which unlatches said brake pedal, braking being accomplished by a ring brake forced downwardly by a spring onto a top of each caster, rotation of a cam by a brake release pedal to withdraw said ring brake from each of said casters.

19. A method of forming and using a reusable and stackable carrying case comprising the steps of:
forming said carrying case from a substantially rectangular bottom panel, a pair of upwardly extending end panels connected to said bottom panel at fold lines, a pair of upwardly extending side panels connected to said bottom panel at fold lines, and a cover panel joined to a top edge of one of said side or end panels at a fold line;
providing releasable closure elements being single columns of upwardly extending nibs intersecting with, and engaging with, respective single columns of upwardly extending interlocking spaced nibs of adjacent side and end panels at about ninety degrees from each other, said engagement of said nibs being engageable at orthogonal right angles;
said single rows of upwardly extending, spaced nibs on adjacent edges of said side and end panels extending continuously top to bottom or side to side along the respective adjacent edges of said side and end panels of said container/carrying case;
said single rows of said nibs on adjacent edges of said side and end panels interlocking at right angles to each other when said adjacent edges of said side and end end panels are brought edge to edge, flush together, with no gaps therebetween, to form said carrying case; and
folding said end panels and side panels upwardly forming a top opening;
swiveling said cover panel between a position closing said top opening and a position exposing said top opening;
using said releasable closure elements along side edges of adjoining side and end panels for securing corners of said carrying case;

using said carrying case to store or ship contents therein; and after emptying said carrying case, opening said panels open up to form a flat, interconnected assembly for storage and shipping.

20. The method of claim 19 in which all of said panels are constructed of rigid plastic material.

\* \* \* \* \*